United States Patent [19]
Stentiford et al.

[11] Patent Number: 5,384,701
[45] Date of Patent: Jan. 24, 1995

[54] LANGUAGE TRANSLATION SYSTEM

[75] Inventors: Frederick W. Stentiford, Woodbridge; Martin G. Steer, Ipswich, both of England

[73] Assignee: British Telecommunications public limited company, London, England

[21] Appl. No.: 711,703

[22] Filed: Jun. 7, 1991

Related U.S. Application Data

[63] Continuation of Ser. No. 201,120, Jun. 2, 1988, abandoned.

[30] Foreign Application Priority Data

Oct. 3, 1986 [GB] United Kingdom ................ 8623839
May 1, 1987 [GB] United Kingdom ................ 8710376

[51] Int. Cl.$^6$ ........................ G06F 15/38; G01L 5/00
[52] U.S. Cl. ................................... 364/419.03; 381/41
[58] Field of Search ................ 364/419, 900 MS File, 364/419.03; 381/36, 41, 51

[56] References Cited

U.S. PATENT DOCUMENTS

| | | | |
|---|---|---|---|
| 4,333,152 | 6/1982 | Best | 364/513.5 |
| 4,412,305 | 10/1983 | Yoshida | 364/419 |
| 4,507,750 | 3/1985 | Frantz et al. | 364/900 |
| 4,525,793 | 6/1985 | Stackhouse | 364/513.5 |
| 4,593,356 | 6/1986 | Hashimoto et al. | 364/419 |
| 4,597,055 | 6/1986 | Hashimoto et al. | 364/900 |
| 4,623,985 | 11/1986 | Morimoto et al. | 364/419 |
| 4,630,235 | 12/1986 | Hashimoto et al. | 364/900 |

FOREIGN PATENT DOCUMENTS

| | | | |
|---|---|---|---|
| 873458 | 5/1979 | Belgium . | |
| 0032062 | 2/1984 | Japan . | |
| 2014765 | 8/1979 | United Kingdom | 364/513.5 |
| 2113048 | 7/1983 | United Kingdom | 381/36 |

OTHER PUBLICATIONS

Krutch, "Experiments in Artificial Intelligence for Small Computers", Howard W. Sams & Co., Inc., 1981, pp. 85–105.
"Machine Translation: Historical Background"–by the Department of the Secretary of State, Canada, Chapter 5 (publication date unknown).
Multilingua 5-1 (1986), pp. 9-13, "Esperanto as the Focal Point of Machine Translation", by A. Neijt.
Communications of the ACM, Apr. 1984, vol. 27, No. 4, "A Perspective on Machine Translation Theory and Practice", by Allen B. Tucker, Jr.
"Green et al, 1963, Baseball: An automatic question answerer," Feigenbaum, E. A. and Feldman, J. (Eds.) 1963 Computers and thought, pp. 207–216, New York, McGraw-Hill.
Raphael, The Thinking Computer: Mind Inside Matter, 1976, W. H. Freeman & Company, pp. 194–195.
Barr et al., "The Handbook of Artificial Intelligence: vol. I", 1981, William Kaufmann, Inc., pp. 282–291.
Miller, "Talking Terminals and Listening Computers Overcome Toy Image", Infosystems, Oct. 1980, pp. 50–56.
Mori, Patent Abstracts of Japan, vol. 9, No. 186, (P377), Abstract No. 60-55434.
Mizoguchi, Patent Abstracts of Japan, vol. 10, NO. 387, Abstract No. 61-175858.

Primary Examiner—David M. Huntley
Attorney, Agent, or Firm—Nixon & Vanderhye

[57] ABSTRACT

A language translation system for translating phrases from a first language into a second language comprises a store holding a collection of phrases in the second language. Phrases input in the first language are each characterized on the basis of one or more keywords, and the corresponding phrase in the second language is output. Such a phrasebook approach enables what is effectively rapid and accurate translation, even from speech. Since the phrases in the second language are prepared in advance and held in store, there need be no problems of poor translation or ungrammatical construction. The output may be in text, or, using speech synthesis, in voiced form. With appropriate choice of keywords it is possible to characterize a large number of relatively long and complex phrases with just a few keywords.

23 Claims, 1 Drawing Sheet

LANGUAGE TRANSLATION SYSTEM

This is a continuation of application Ser. No. 07/201,120, filed 2 Jun. 1988, now abandoned.

FIELD OF THE INVENTION

This invention relates to a system for translating phrases from a first language to a second language, and in particular but not exclusively to such a system for producing speech in a second language from speech in a first language.

BACKGROUND OF THE INVENTION

A machine which can rapidly and automatically translate languages, particularly speech, has been sought for many years. However, even with the tremendous progress in computing, speech recognition and speech synthesis in recent years, such machines remain the stuff of dreams and fiction.

Considerable research has been carried out on computer systems for the automatic translation of text. Apart from a few very restricted applications (e.g. translation of weather forecasts), no product exists which can automatically produce accurate translations and hence replace human translators. The problems of translating speech are compounded by the errors of speech recognition, the additional information in intonation, stress etc and the inexactness of speech itself.

Unfortunately, existing text language translation packages are all deficient in some way or another and do not meet the requirements of a system translating speech-to-speech. Most such packages have been designed as an aid for professional translations, and produce outputs which have to be post-edited before being presentable in their target language. Most packages are either menu-driven and interactive or operate in a slow batch processing mode, neither of which is suitable for "real-time" speech operation. Translation packages also tend to be unreliable, as idioms and other exceptions can easily cause erroneous output: the user has no guarantee that the output is correctly translated. Existing systems are also very CPU intensive, making them inexpensive to run and hence unsuitable for many cost sensitive applications.

SUMMARY OF THE INVENTION

The present invention seeks to provide a translation system in which these deficiencies and disadvantages are mitigated.

According to the present invention there is provided a system for translating phrases from a first language into a second language, comprising: a store holding a collection of phrases in the second language; input means to accept a phrase in the first language; output means to output in the second language a phrase comprising one from said collection of phrases; characterization means to determine which of said collection of phrases corresponds to said input phrase; means responsive to said characterization means to control the output means and to ensure the outputting of the phrase from said collection which corresponds to said input phrase.

Such a system provides very quick translation, the time required being that to identify/characterize the input phrase and that to look up the 'answer' in the second language.

The system can also be implemented to give the user providing the input confirmation that she/he has been recognized/understood correctly by the system, which is of course particularly important to speech translation systems.

Once it has been confirmed to the user that his message has been correctly characterized, accuracy of translation is ensured because the stored collection of phrases consists only of previously made accurate translations.

The system also makes possible rapid translation into several second languages simultaneously; essentially all that need be added are further stores holding collections of phrases in each of the additional second languages.

BRIEF DESCRIPTION OF THE DRAWINGS

Embodiments of the invention will now be described with reference to the accompanying drawings in which.

DETAILED DESCRIPTION OF A PRESENTLY PREFERRED EXEMPLARY EMBODIMENT

Figure 1:
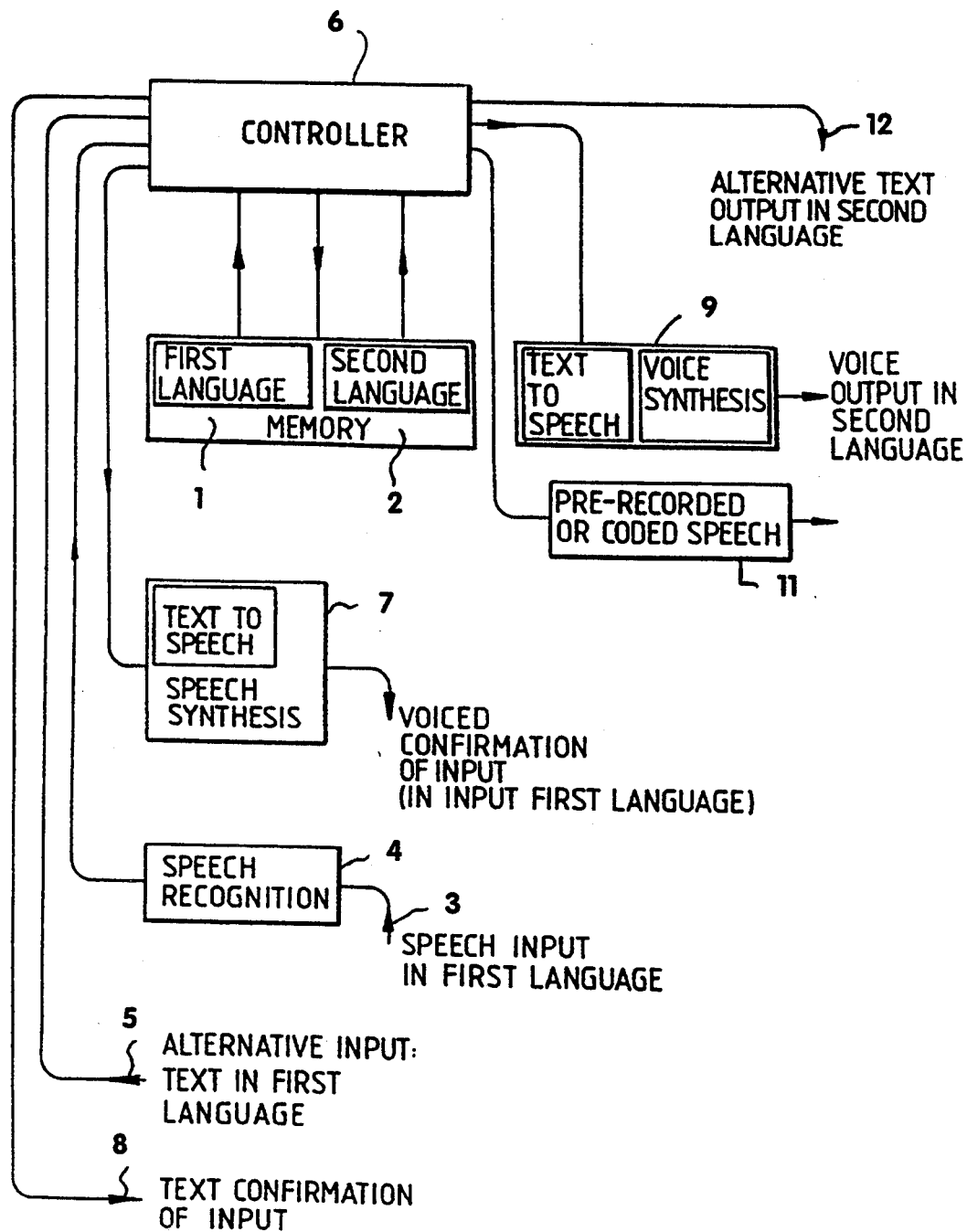
FIG. 1 is a block diagram showing the principal components of a system according to the invention.

The apparatus for translating phrases from a first language into a second language has a first score 1 in which are stored a repertoire of phrases in the first language, and a second store 2 in which are stored a collection of phrases in the second language which are previously-prepared accurate translations of the phrases of said repertoire.

Input speech signals to be translated are in use supplied to an input 3 and thence to a speech recognizer 4—or alternatively text may be input at an input 5, e.g., from a keyboard (not shown).

The present invention is based on our appreciation that it is possible to characterize and capture the semantic content of a large number of distinct phrases by means of a very much smaller number of keywords.

Characterization means are provided in the form of controller 6, which may for example be a computer such as the IBM PC XT. This determines the correspondence of phrases on the basis of the presence in the input phrase of keywords, using a keyword list (the generation of which is described below). With appropriate selection of the keywords it is possible to use existing, commercially available speech recognizers, which are only capable of recognizers considerably fewer words than would be contained in a usefully large set of phrases, to characterize and differentiate a large set of phrases.

When the controller 6 has identified the phrase, it indicates to the user which of the phrases in the first store (i.e., in the input language) it will translate via a speech synthesizer 7 or text output 8. This is confirmed with the user (the recognizer 4 can also recognize system control words) and the controller 6 then outputs, from the collection in the second store 2, the required phrase in the second language, via output means such as a speech synthesizer 9 to an output 10. Alternatively prerecorded or coded speech may be output (11), or text may be output (output 12).

In order to generate the keyword list, a keyword extraction process is followed, as will now be described.

The performance of the translation system as a whole therefore rests on the ability of those keywords to correctly distinguish between phrases. The greater the separation of phrases achieved, the greater the system's tolerance to recognition errors, and also discrepancies introduced by the speaker himself.

The Selection of Keywords

A suitable search procedure is as follows:

1. Order each of the K words in the N phrases of interest according to the word's frequency of occurrence in the phrases.
2. Select the M most frequently occurring words as the initial keyword list, where M is the number of words in the vocabulary of the speech recognizer.
3. The presence or absence of each keyword in each phrase is then determined. The number of phrases (E) which are not distinguished by the keywords are counted.
4. Let $i=1$.
5. A keyword is temporarily deleted from the list and the new value (E') of E is computed.
6. The score $E'-E$ is assigned to the keyword which was temporarily deleted; this being a measure of worsening of the performance after the renewal of the keyword, and hence its contribution to the overall performance. (In effect, this measure is used to ensure that each keyword contributes to the separation of as many phrase pairs as possible but without simply duplicating the function of others.)
7. Temporarily deleted keywords are replaced and the process is repeated for each of the M keywords.
8. The word with the lowest score is removed from the current keyword list.
9. The M+ith most frequency word is then used to replace the removed word, and then a new E is calculated.
10. If the new E indicates an improved performance over the previous E then i is incremented and the process is repeated from step 5 unless $M+i>K$ in which case the process stops. Otherwise the M+ith word is rejected; i is incremented and the process is repeated from step 9 unless $M+i>K$ in which case the word last removed in step 8 is replaced and the process stops.

The final keyword list contains the optimal set of M single keywords for phrase identification.

Further iterations starting with the best M words from the previous iteration may yield further improvements in phrase separation. Heuristics other than frequency ordering may be used to provide the succession of candidate words in step 1, especially if a priori linguistic information is available. In addition, it is likely that the words towards the bottom of the occurrence list will not appreciably aid separation of phrases, and it may therefore not be worth searching through more than say the upper third or upper half of the occurrence list.

It is sometimes the case that most phrases are distinguished and E becomes very close to zero quite early in the search. Further improvements are obtained in these cases by computing E on the basis that phrases are only considered distinguished if more than one keyword is different. This ensures that most phrases are separated by more than a minimum number of keywords and provides some immunity to speech recognition errors.

During the search it becomes clear that several classes of phrase are never going to be separated unless the keyword vocabulary is extended. These "clusters" or groups of phrases tend to differ only by a single word or subordinate string of words (e.g. dates in business letters), and are candidates derived automatically for use in the preparation of keyword subvocabularies (detailed below).

It is apparent that the recognition of single keywords takes no account of word order and the additional meaning that it may contain. The presence or otherwise of key pairs (or other multiples) of words with various separations between them can therefore also be used to improve the effectiveness of the single keyword set. This has the advantage in speech recognition that the performance may be improved without increasing the recognition vocabulary. In a text application further improvements can be obtained by generalizing the keywords to include punctuation, parts of words, and combinations of words and parts of words. e.g. "-ing * bed" (where * can be any word) would be present in "making the bed" and "selling a bed".

The use of pairs of keywords (e.g. we * * to) enhances the value of the component single words if further phrase confusions are resolved. The search for word pairs which are not necessarily contiguous but separated by different numbers of other words, again begins with the preparation of a frequency ordering. Word pairs with both component words in the M keywords are made from the ordered list if they resolve any remaining phrase confusions. The final list of single keywords and pairs of keywords are each scored as before and an overall phrase confusion score E computed.

The search now begins for better performing word pairs where one or both of the component keywords are not in the current keyword list. The next word pair candidate is taken from the top of the frequency ordering and appended to the keyword list. The single keywords in the appended word pair which are not already present are also added and an equal number of the worst performing single keywords deleted. This may cause other word pairs to be deleted if their component words are not longer present. A new value (E') of E is computed. If an improvement is obtained and $E'<E$, the most recent modifications of the keyword list are retained, otherwise the list is restored to its previous state. Further word pairs are processed from the frequency ordering, although as with the single keyword search, other heuristics may be used to provide candidate word pairs.

It is worth observing that some keywords contribute more to the overall performance through their participation in several word groups than by themselves.

The method extends to larger keyword groupings (>2 words), but as the frequency of occurrence decreases, the contribution to the resolution of phrase confusions are only significant in a very large corpus of phrases.

The quantity of computation involved in the search for keywords increases with the number of keywords and the number of phrases. This may be reduced by first running the algorithm on a subset of phrases which are confused or very close to being confused. The keywords and their scores so obtained provide a more efficient ordering of candidate keywords to the main algorithm which will work with a more complete set of phrases.

In a speech recognition application some words which are not in the keyword set can generate many spurious keyword recognitions, e.g. occurrences of the word "I" may be always recognised as the keyword "by". If however, the groups of confused words are considered as synonymous before the search for keywords begins and in the subsequent phrase identification, the actual phrase separations should not be affected by this problem. Furthermore because the frequency of such synonymous words taken together is necessarily higher than that of the separate words, a greater quantity of phrasal information is normally associated with their detection.

The use of keywords may be extended to keyword-parts (e.g. phonemes) which occur again with higher frequency and which bear more phrase distinguishing information than the whole words. Moreover the identification of certain word-parts in continuous speech is often easier than complete words, and is therefore preferable in a translation system which accepts continuous speech input. Throughout this specification the word "keyword" is for the sake of brevity used to refer to both whole keywords and to parts of keywords.

Many classes of phrase only differ from each other in subordinate phrases and clauses which may contain details of dates, times, prices, items, names or other groups of words. It may be that the vocabulary of a speech recognizer is sufficient to assign a phrase to a particular class or group of phrases but is not large enough to hold sufficient keywords to separate the subordinate structures. Furthermore it is quite possible that the total vocabulary required to separate the phrase classes and the subordinate structure contains many more words which are easily confused. This means that even if the capacity of the recognizer was sufficient to cover the whole vocabulary, the performance would be too low to obtain reliable phrase and subordinate phrase identification. It is an advantage of the method according to the invention that the original utterance or some transform of the original utterance may be stored in a buffer and the recognition process may be repeated, once the phrase class has been determined, using the set of keywords which are expected in the subordinate word strings particular to that phrase class. In this way the recognition apparatus never has to cope with the total vocabulary, with its many potential word confusions, at once, but appears to the user to do so. It should be noted that the speed of the second recognition process is not limited by the speed of the original utterance and can in principle be carried out much faster than real time and hence not necessarily introduce noticeable delays. The iterations of recognition may be carried out as many times as is necessary to identify the required phrase and its substructure. It thus becomes possible to 'nest' the recognition process, the phrase being characterised in numerous separate stages, the recognizer at each stage drawing on a different vocabulary of keywords.

Many, although not all, subordinate word strings will be context independent in the source language. This is because positions for subordinate word strings are only designated as such if several alternatives are possible making tight contextual dependence less likely for any one of them. In addition contextual importance would imply that there were dependencies between words which were inside and outside the potential subordinate string and hence there would be scope for keywords to distinguish the whole phrase without the use of words inside the string. This is illustrated in phrases containing changing dates in which there is rarely any word change necessary in the phrase apart from the date itself. (It is for future research to demonstrate the conjecture that such context independence is generally invariant between languages and use it to extend phrase-book translation indefinitely.)

This particular aspect of the invention also has significant benefits when employed for the translation of text where the computational costs of searching large dictionaries can be reduced dramatically by using a similar hierarchy of smaller dictionaries and phrasebooks. Some subordinate phrases do not need to be translated and often in these cases it would not in general be possible to recognize automatically the words in these phrases. The commonest case of this occurs in utterances which make reference to labels such as proper nouns: e.g. "Can I speak to Mr Smith please?". As before, the system can identify the phrase class together with the locations of words in the buffer which correspond to the label reference. The processing of such label reference words during translation is then simply the transmission of the original acoustic signal in the appropriate place in the target language utterance. Clearly it is desirable that the synthesised target language voice should match the voice of the original speaker and it is a requirement of text-to-speech synthesisers that certain speech parameters can be set so that such matching can be achieved as far as possible (e.g. old/young, male/female).

So that the user can be sure that the correct phrase will be output in the target language, the system indicates what phrase in the input language it will translate. In order to be able to do this, the system is provided with a store holding the full repertoire of phrases in the input language.

Preferably in the system the phrases are stored as text, in for example ASCII coded form, since that reduces the storage requirement very considerably compared to that needed for conventionally companded or non-companded speech. Where speech output is required, the text is retrieved from store and passed to a text to speech converter and speech synthesizer. With ASCII coded text storage, 1 byte per character is needed, which means that about 10,000 phrases could be stored with half a megabyte of storage. Hence a system providing translation of about 10,000 phrases would require about 1 megabyte of storage—which is easily provided on hard disc.

Preferably the system comprises first and second terminals operably connected via a data link. The first terminal provides an input means and characterization means, and the second terminal provides a store and output means. The first terminal preferably accepts a phrase in a first language, determines which one of a collection of phrases stored in the store the first language phrase corresponds to, and generates a message for transmission to the second terminal via the data link, which message indicates which of the collection of phrases stored in the store corresponds to the input phrase. Two-way communication is possible using two symmetrically constructed translation systems. This has the advantage that each unit is only concerned with recognising and synthesising words in the language of the person operating that unit. Communication with the second unit is by means of a protocol which specifies the phrase and the contents of any subordinate phrases. The protocol is independent of language and hence allows messages to be transmitted without the need to identify the target language. In addition it allows people using many different languages to receive simultaneously translations from the output of a single unit.

EXAMPLE

A demonstration system, connected to a telephone network, has been run to demonstrate the feasibility of the phrase-book approach. The demonstration system uses a Votan speech recogniser, an Infovox speech synthesiser and an IBM PC XI computer.

The Votan speech recogniser is capable of recognizing up to 64 continuously spoken words over a telephone network. Allowing for system control words such as "yes", "no", "quit" and "enter", upto 60 words can be chosen to be keywords. None of the system control words are allowed to appear in the input phrases, so where it is possible it may be preferable to use control buttons or keys rather than spoken commands.

The store of phrases consists of 400 English phrases and their French equivalents.

The English phrases contain around 1100 different words. To put these numbers in context, a standard phrasebook of business expressions would typically contain this number of phrases.

After running keyword extraction software based on the principles outlined above, 60 keywords were chosen which successfully separated all the phrases. Of the 400 phrases, only 32 were distinguished by just a single word (those 32 phrases being in 16 pairs).

The demonstration system, on recognising the keyword(s), accesses the appropriate phrase, confirms it (orally) with the user and outputs the French equivalent via a test to speech synthesizer.

It is important to note that text-to-speech synthesis is not essential to this invention. It is quite feasible, indeed advantageous, to synthesise target language speech from pre-recorded or coded words and phrases. This has the advantage that such speech may be recorded by the user and hence will acoustically match any embedded speech, and removes the need for text-to-speech synthesis. This approach also removes the need for text-to-speech synthesis in the languages of important countries where such technology is unlikely to produce useable hardware in the immediate future—for example Hindi and Arabic.

In addition to speech-to-speech translation, the present invention is of course applicable to text-to-text, text-to-speech or speech-to-text translation. A particularly useful application is in the field of office automation, where a speech activated foreign language text producing machine could readily be implemented. Essentially, such a machine would use the speech recogniser, software and control system described above, but output the 2nd language text to a printer or telex or other telecommunications link. It would of course be a simple matter to provide the standard phrases of everyday business correspondence in several languages.

We claim:

1. A system for translating phrases from a first language into a second language, comprising:
   input means for accepting an input phrase in the first language;
   a store holding a collection of phrases in the second language;
   characterization means connected to said input means for determining which phrase of the collection corresponds to the input phrase, and to control the output of that phrase; and
   output means responsive to the characterization means for outputting the determined phrase in the second language;
   wherein the characterization means comprises means for recognizing in the input phrase the presence of at least one keyword or keyword parts of a predetermined set of keywords or keyword parts, the number of members in the set of keywords being smaller than the number of phrases in the collection, and to select, in dependence on those recognized keywords or keyword parts, a stored phrase from the collection.

2. A system as claimed in claim 1, the system comprising first and second terminals operably connected via a data link, the first terminal comprising said input means and said characterisation means; the second terminal comprising said store and said output means; wherein said first terminal further comprises means to generate a message for transmission to said second terminal via said data link, which message indicates which of said collection of phrases corresponds to said input phrase.

3. A system as claimed in claim 1 wherein the characterisation means comprises a speech recogniser.

4. A system as claimed in claim 1, wherein said input means is capable of accepting spoken inputs, and said output means provides voiced outputs.

5. A system as claimed in claim 1 wherein means are provided to enable portions of said input phrase to be passed untranslated to said output means for outputting as part of the phrase in the second language.

6. A system as claimed in claim 1 further comprising a keyboard for providing an input message to said input means, and means to provide a text output in said second language.

7. A system as claimed in claim 1 for providing translations from a first language into any one of a plurality of second languages, a collection of phrases in each of said plurality of second languages being provided in a respective store.

8. A system according to claim 1, in which each phrase of said collection contains a unique keyword, keyword-part or combination of keywords or keyword-parts.

9. A system according to claim 1 in which the characterization means is operable in the case that more than one keyword is recognized in the input phrase to make use of their relative positions within the input phrase for the purpose of distinguishing between phrases of the collection.

10. A system according to claim 1, further including a store containing a collection of phrases in the first language, each corresponding to a phrase of the collection in the second language, and output means for output of the determined phrase in the first language for confirmation by a user prior to its being output in the second language.

11. A system as claimed in claim 1, in which the characterization means applies a first set of keywords to determine to which phrase or group of phrases, if any, from said collection of phrases the input phrase corresponds, and, in the case that the input phrase is found to correspond to an undetermined one of a group of phrases, the characterization means applies a second set of keywords to determine to which one of the group of phrases the input phrase corresponds.

12. A system for translating multi-word phrases, said system comprising:
   input means for providing a discrete multiword input phrase;
   keyword recognition means connected to receive said provided input phrase for maintaining a set of keywords optimally selected for a desired set of plural phrases to be recognized and for identifying correspondence between said provided input phrase and a phrase within said set of plural phrases in response to detected occurrence of multiple ones of said keywords within said input phrase;

memory means for storing a set of output phrases corresponding to said set of plural phrases; and outputting means operatively connected to said keyword recognition means and to said memory means for selecting and outputting an output phrase from said memory means corresponding occurrences within said input phrase, wherein:
said keyword recognition means includes means for maintaining a plurality K of keywords; and
said desired set of input phrases to be recognized comprises N input phrases, N>K.

13. A system as in claim 12 wherein said set of plural phrases to be recognized are in a first language, and said memory means stores said plural output phrases in a second language different from said first language.

14. A system as in claim 12 wherein said keyword recognition means includes keyword memory means for storing as keywords only an optimal subset of words occurring in said set of phrases to be recognized, said optimal subset being determined beforehand as being most useful in distinguishing between phrases within said set of desired plural multiword phrases to be recognized.

15. A system as in claim 12 wherein no one-to-one correspondence exists between keywords and input phrases to be recognized.

16. A system for translating phrases from a first language into a second language, comprising:
a store holding a collection of phrases in the second language;
input means for accepting a phrase in the first language;
characterization means connected to said input means for determining which of said collection of phrases corresponds to said input phrase, said characterization means comprising keyword detection means for detecting in said input phrase the presence of members of a predetermined set of keywords or keyword parts in said first language, said predetermined set being smaller than the total number of words in the phrases in said first language which would correspond to said collection of phrases;
lookup means arrange to access said store to address that phrase which corresponds to the input phrase in dependence upon the keyword or keyword parts or combinations thereof detected by the characterization means in the input phrase; and
output means responsive to said lookup means for outputting said phrase in said second language.

17. A system for translating voiced phrases from a first language into a second language, comprising:
input means for accepting a voiced input phrase in the first language;
a store holding a collection of phrases in the second language;
characterization means comprising speech recognition means and connected to said input means for determining which phrase of the collection corresponds to the voiced input phrase and to control the output of that phrase;
output means responsive to the characterization means for outputting the determined phrase in the second language; and
wherein the characterization means comprises means for recognizing in the voiced input phrase the presence of at least one keyword or keyword part of a predetermined set of keywords or keyword parts, the number of members in the set of keywords being smaller than the number of phrases in the collection, and to select, in dependence on those recognized keywords or keyword parts, a stored phrase from the collection.

18. A system as claimed in claim 17 in which the speech recognition means applies a first set of predetermined keywords to determine to which phrase or group of phrases, if any, from said collection of phrases the voiced input phrase corresponds, and in the case that the voiced input phrase is found to correspond to an undetermined one of a group of phrases, the speech recognition means applies a second set of predetermined keywords to determine to which one of the group of phrases the input phrase corresponds.

19. A system for translating voiced phrases from a first language into a second language, comprising:
a store holding a collection of phrases in the second language;
input means for accepting a voiced input phrase in the first language;
characterization means connected to said input means for determining which of said collection of phrases corresponds to said voiced input phrase, said characterization means comprising speech recognition means configured to operate as keyword detection means, for detecting in said input phrase the presence of members of a predetermined set of keywords or keyword parts in said first language, said predetermined set being smaller than the total number, Z, of words in the phrases in said first language which would correspond to said collection of phrases, said speech recognition means having a recognition vocabulary of P words, where P is smaller than said total number Z;
lookup means arranged to access said store to address that phrase which corresponds to the input phrase in dependence upon the keyword or keyword parts or combinations thereof detected by the characterization means in the input phrase; and
output means responsive to said lookup means for outputting said phrase in said second language.

20. A system according to claim 19, wherein said output means is arranged to provide voiced outputs in said second language.

21. A system according to claim 19 in which the characterization means is operable in the case that more than one keyword is recognized in the input phrase to make use of their relative positions within the input phrase for the purpose of distinguishing between phrases of the collection.

22. A system for translating speech from a first language into a second language, said system capable of distinguishing between and translating N different spoken input phrases, said system comprising:
keyword defining means for defining a predetermined set of keywords, the number of keywords within said predetermined keyword set being less than N;
recognition means, coupled to said keyword defining means, for receiving a spoken input phrase to be translated and for recognizing correspondence between keywords within said keyword set and less than all of said spoken input phrase; and output means for generating a translation of said spoken input phrase into second language in response to said recognized correspondence.

23. A system as claimed in claim 22 wherein said recognition means includes a speech recognition arrangement that recognizes portions of said spoken input phrase that correspond to keywords and ignores portions of said spoken input phrase that do not correspond to keywords.

* * * * *